Patented Feb. 24, 1953

2,629,707

UNITED STATES PATENT OFFICE 2,629,707

MANUFACTURE OF LAP-RESISTANT SYNTHETIC RUBBER

Jacob E. Charles, Lancaster Township, Lancaster County, Pa., assignor to Armstrong Cork Company, Lancaster, Pa., a corporation of Pennsylvania No Drawing. Application June 16, 1950, Serial No. 168,647

2 Claims. (Cl. 260—80.7)

This invention relates to an improvement in the preparation of rubberlike multipolymers of butadiene, acrylonitrile, and sorbic acid. More particularly, the invention relates to the preparation of the emulsion normally used in an emulsion polymerization process utilizing butadiene, acrylonitrile, and sorbic acid as the monomeric constituents which undergo polymerization.

It has been the practice in producing rubberlike polymers from such monomeric mixtures as those containing butadiene and acrylonitrile to warm water to a temperature of approximately 65° C. to 68° C. To the warmed water are then added catalysts and emulsifying agents and in some instances, when additional reactants are to be incorporated, these are included in the aqueous mixture. Following the preparation of this mixture it is transferred to the reaction vessel and thereafter the monomers which are to be polymerized are added. The material is then subjected to agitation while maintaining a convenient elevated temperature, and the reaction is carried on until polymerization is substantially complete. The copolymers resulting from emulsion polymerization of mixtures containing butadiene and acrylonitrile are capable of use in a variety of fields. One particular field in which such materials are used to a great extent is in the textile roll covering field, particularly in the production of textile cots. A textile cot is prepared by compounding the product of the emulsion polymerization with suitable ingredients including a vulcanizing agent, forming the compounded material into a cot and thereafter vulcanizing the formed material.

One important characteristic of synthetic rubber textile cots produced from butadiene and acrylonitrile is the fiber repellancy or lap resistance of such materials. This is an important characteristic inasmuch as in order to be useful for the intended purpose a textile cot must resist the lapping up of the fibers during the drafting operation.

In order to impart increased lap resistance to rubberlike copolymers of butadiene and acrylonitrile, various agents have been included as a component of the mixture subjected to polymerization by the emulsion technique. One particularly desirable component is sorbic acid for it has been found that sorbic acid imparts increased resistance to lapping up when the rubberlike product is compounded and made into a textile cot or similar textile machine element.

I have found that improved characteristics may be obtained in a textile cot, particularly with regard to resistance to lapping up when the first step of the emulsion preparation of the polymerization process is carried out under certain carefully controlled conditions. In accordance with my invention the formation of the mixture of water, emulsifying agent, addition agent such as sorbic acid, and catalysts, is carried out at elevated temperatures. Typical of the temperatures at which this preparation is conducted are temperatures of about 80° C. to about 100° C. I have obtained particularly advantageous results by utilizing a temperature of approximately 90° C. to 100° C. Following the preparation of the mixture at the temperatures indicated above, the aqueous mixture is then transferred to any suitable reactor after which the butadiene and acrylonitrile are added. The resulting emulsion of polymerizable material is then subjected to conventional polymerization conditions which may vary considerably. Generally speaking, it is desirable to agitate the emulsion at a temperature of about 50° F. to about 175° F. When the conditions of my invention are followed, a higher percentage of conversion is obtained in a comparatively short period of time, and more particularly the fiber repellancy of a textile cot prepared under such conditions is increased considerably. For example, when employing conventional emulsion preparation conditions such as about 65° C., the lap resistance, when compared to a standard control, is approximately 70% to 120%. However, when the conditions of my invention are carried out, the lap resistance increases to about 130% to 200% of the standard control.

My invention is particularly adaptable to the preparation of rubberlike polymers in which sorbic acid is employed because the first stage of the emulsion preparation is carried out at the elevated temperatures indicated above, and the aqueous mixture contains surface active agents such as sodium lauryl sulfate, alkyl sulfates, aromatic sulfonates, and the like, and catalysts together with the desired quantities of sorbic acid. Generally speaking, the monomers in the polymerizable mixture are present in about the following proportions by weight:

| | Per cent |
|---|---|
| Butadiene | 55 to 78 |
| Acrylonitrile | 20 to 40 |
| Sorbic acid | 2 to 5 |

While I do not intend to be limited by any theories expressed herein, it is believed that the improvement in lap resistance is caused by more complete dispersion of the sorbic acid, thereby causing an improvement in the desired characteristics.

In order to more fully understand my invention reference may be had to the following specific examples. Example I is illustrative of the prior art method of emulsion preparation, and Examples II and III illustrate my invention.

*Example I*

A mixture consisting of 14.4 parts of distilled water, 0.38 part of "Aquarex D" (sodium salt of the sulfate monoester of a mixture of higher fatty alcohols consisting essentially of lauryl and myristyl derivatives), 0.04 part of sodium perborate, and 0.4 part of sorbic acid was prepared by agitating in an open vessel equipped with a mechanical stirrer while maintaining a temperature of approximately 65° C. until a homogenous mixture was obtained. The pH of the resulting mixture was 4.35. This mixture, while warm, was introduced into a closed polymerization reactor and 2.0 parts of acrylonitrile, 0.028 part of dodecyl mercaptan, 0.02 part of diisopropyl xanthogen disulfide, and 5.6 parts of butadiene were added. The resulting emulsion of polymerizable material was heated at a temperature of between 132° F. and 135.5° F. with mechanical agitation for a period of twelve hours. A yield of polymer amounting to 59.7% of the monomers charged was obtained.

*Example II*

A rubberlike material was prepared utilizing the same ingredients in the same proportions as in Example I, but the first step of the emulsion preparation, namely, the formation of the mixture of distilled water, "Aquarex D," sodium perborate, and sorbic acid was carried out at a temperature of 95° C. The pH of the resulting mixture was 4.55. This mixture was then introduced into the polymerization reactor, and the same quantities of the same ingredients as stated in Example I were added. Using the same temperature of polymerization a yield of 78% was obtained after 8½ hours.

*Example III*

Example III is similar to Example II except that the pH of the mixture fed to the reactor was about 4.43, and the polymerization was continued for 9 hours. The yield of polymer was 90%.

Rubberlike polymers such as those prepared in accordance with Examples II and III may be compounded with any of a number of conventional compounding agents such as vulcanizing agents, accelerators, and the like and vulcanized to the shape of a textile cot or other element.

A typical compound for use in the manufacture of cots is illustrated in the following specific example in which all parts are given by weight:

*Example IV*

| | |
|---|---|
| Polymer of Example III | 100 |
| Clay | 50 |
| ZnO | 5 |
| TiO$_2$ | 15 |
| Dipolymer oil | 15 |
| Sulphur | 10 |
| Benzo-thiazyl disulphide | 2 |

The manner of forming the desired roll cover may be any of those customarily used in the manufacture of textile cots or other textile machine elements. For example, the material may be molded on a suitable mandrel in the form of a sleeve therefor, stripped from the mandrel, and cut into the desired lengths.

I claim:

1. A process of preparing a rubberlike multipolymer which comprises forming an aqueous mixture containing sorbic acid, and emulsifying agent, and a catalyst for emulsion polymerization while maintaining a temperature between about 80° C. and 100° C., adding to said mixture butadiene and acrylonitrile, and agitating the resulting emulsion while maintaining temperature conditions between about 50° F. and 175° F.

2. In the process of producing a rubberlike polymer of a mixture containing butadiene, acrylonitrile, and sorbic acid the improvement comprising admixing sorbic acid, an emulsifying agent, and a catalyst for emulsion polymerization with water while maintaining a temperature between about 90° C. and 100° C., adding to the resulting mixture butadiene and acrylonitrile, and agitating the resulting emulsion while maintaining temperature conditions between about 50° F. and 175° F.

JACOB E. CHARLES.

REFERENCES CITED

The following references are of record in the file of this patent:

UNITED STATES PATENTS

| Number | Name | Date |
|---|---|---|
| 2,422,932 | Schroeder et al. | June 24, 1947 |